United States Patent [19]

Hayashi et al.

[11] Patent Number: 5,828,977

[45] Date of Patent: Oct. 27, 1998

[54] PROGRAM/DATA OVERWRITING CONTROL AFTER MACHINE STOP

[75] Inventors: Shinnosuke Hayashi, Nukata-gun; Hiroshi Shibata, Kariya, both of Japan

[73] Assignee: Nippondenso Co., Ltd., Kariya, Japan

[21] Appl. No.: 686,699

[22] Filed: Jul. 26, 1996

[30] Foreign Application Priority Data

Jul. 31, 1995 [JP] Japan .................................. 7-195519

[51] Int. Cl.⁶ .................................................. F02O 41/00
[52] U.S. Cl. ........................................................ 701/115
[58] Field of Search .......................... 701/115; 123/486; 364/900, 431.12

[56] References Cited

U.S. PATENT DOCUMENTS

| 4,510,569 | 4/1985 | Takao et al. | 364/431.12 |
| 4,908,792 | 3/1990 | Przybyla et al. | 364/908 |
| 5,293,317 | 3/1994 | Adrain et al. | 364/431.12 |
| 5,602,738 | 2/1997 | Sasaki | 701/115 |
| 5,668,726 | 9/1997 | Kondo et al. | 701/115 |

FOREIGN PATENT DOCUMENTS

| 0323211 A2 | 7/1989 | European Pat. Off. | 701/115 |
| 0455174 A2 | 4/1991 | European Pat. Off. | 701/115 |
| 3824754 A1 | 2/1989 | Germany | 701/115 |
| 2-99746 | 4/1990 | Japan | 701/115 |
| 6-272611 | 9/1994 | Japan | 701/115 |

Primary Examiner—Raymond A. Nelli
Attorney, Agent, or Firm—Nixon & Vanderhye P.C.

[57] ABSTRACT

An engine control program is not overwritten when an engine of a vehicle is in operation even if a memory writer sends an engine write request to an engine controller. When an operator stops the engine and the memory writer again requests to overwrite the engine control program, the engine controller receives a write control program from the memory writer and executes the same. After that, the engine controller starts a new engine control program after its CPU is reset. Therefore, since the engine is at a stop during the overwriting of the engine control program, there will be no unexpected operations in the mechanism of the vehicle even though the control program and data are changed.

34 Claims, 6 Drawing Sheets

PROGRAM/DATA OVERWRITING CONTROL AFTER MACHINE STOP

CROSS-REFERENCE TO RELATED APPLICATION

This application is based on and claims priority from Japanese Patent Application No. Hei-7-195519, the contents of which are incorporated herein by reference.

BACKGROUND OF THE INVENTION

1. Field of the Invention

The present invention relates to overwriting a program or data into a nonvolatile memory of a machine controller. In particular, the present invention relates to overwriting a built-in program or data for controlling an automotive engine.

2. Description of Related Art

A program of an engine controller for controlling an automotive engine may be overwritten with different control programs to test engine performance, tune the engine or the like.

Conventionally, overwriting of the program of the engine controller is executed by connecting a program writer to the engine controller and coordinating the processes of the engine controller and the program writer.

That is, immediately after being reset, a CPU of the engine controller checks a signal of a mode determination control signal line generated by the program writer. If the signal does not indicate a program write mode, a built-in control program is activated and engine control starts. If the signal of the mode determination control signal line indicates the program write mode, the built-in control program is not activated and the engine controller reads a new control program transmitted by the program writer and the contents of such new control program are overwritten on the built-in control program, and subsequently the new control program is started.

For example, when the control program is to be overwritten, the overwriting process of such program is carried out immediately after resetting of the CPU of the engine controller to enable switching to the write mode to overwrite the control program when the same cannot be executed properly due to an abnormal operation (for example, disconnection of electric power) during the writing process.

Japanese Patent Application Laid-Open No. Hei 6-272611 discloses an engine controller which does away with the requirement for overwriting the control program before executing the same.

When there is a serial communication interruption (SCI) from the program writer, the engine controller follows a predetermined sequence, and thus, the control program can be overwritten even during the control program execution. Furthermore, the overwriting can be carried out while the engine itself is in operation.

In the foregoing device, since control data set corresponding to the condition of the engine remains in the RAM temporarily even when the control program is overwritten while the engine is in operation, the data can be copied back after overwriting so that the engine can be driven steadily.

However, overwriting of the control program means a sudden shift to a control procedure different from the one being executed before such overwriting. When the engine is being driven during such overwriting, the driving condition of each automotive mechanism driven by the engine may change suddenly which may make the driver uncomfortable.

This kind of problem occurs not only for engine control but also, for example, for brake control, transmission control, suspension control and the like in which the driving condition may suddenly change when the control program and the control data are overwritten.

SUMMARY OF THE INVENTION

In view of the foregoing problems in the prior art, it is an object of the present invention to provide a machine controller whose built-in control program and control data can be overwritten without causing unexpected operating conditions such as sudden changes in its operation and in a machine it is controlling, and control malfunctions and the like when the built-in program and the built-in data are overwritten while the machine is being driven.

To achieve these aims, a first aspect of the present invention provides a machine controller for controlling operation of a machine following a built-in program. This machine controller includes a write command detecting unit for detecting an external write command, an operating condition detecting unit for detecting an operating condition of the machine which corresponds to inoperativeness of the machine and a writing unit for overwriting an externally supplied control program on the built-in program based on the external write command detected by the write command detecting unit and the operating condition detected by the operating condition detecting unit. Therefore, overwriting of the built-in program is performed based on the detected write command and the detected operating condition of the machine.

Preferably, the writing unit overwrites the control program on the built-in program only when the write command detecting unit detects input of the external write command and the operating condition detecting unit detects that the machine is at a stop. In this way, the built-in program and data are overwritten only when the write command is received and the machine is at a stop. Thus, the built-in program and data are not overwritten when the machine is in operation and so there will be no unexpected operations in the machine that will make an operator of the machine feel uneasy.

Preferably, the machine controller further includes a reporting unit for reporting the operation condition of the machine in a human recognizable manner. In this way, the operator of the machine will know when to stop the machine when performing the overwriting of the built-in program.

Preferably, the machine controller further includes a terminating unit for terminating the operation of the machine. In this way, there is no need for the operator to stop the operation of the machine because this task is done automatically by the terminating unit and so, efficiency of overwriting the built-in program improves.

Preferably, the terminating unit gradually terminates the operation of the machine. For example, the machine can be stopped after reducing the engine rotational speed down to an idling state. In this way, durabilities of the machine and mechanisms driven by the machine are prolonged and the operator will not feel uneasy unlike in the case when the machine is abruptly terminated.

Preferably, the machine controller includes a memory unit for storing an overwriting routine which is used by the writing unit for overwriting the control program on the built-in program. The overwriting routine is not overwritten when the writing unit is overwriting the built-in program and so, the overwriting of the control program can be performed smoothly. The memory unit can be a RAM unit or a programmable ROM unit.

Preferably, the machine is a vehicle and the built-in program is for controlling the vehicle. In this way, the machine controller can overwrite the built-in program for controlling the vehicle.

Another aspect of the present invention provides a program writing method of the machine controller which includes the steps of detecting an external write command, detecting a stop of the machine, and overwriting an externally supplied control program on the built-in program only when the external write command is detected and the stop is detected.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are hereinafter described with reference to the accompanying drawings.

Figure 1:
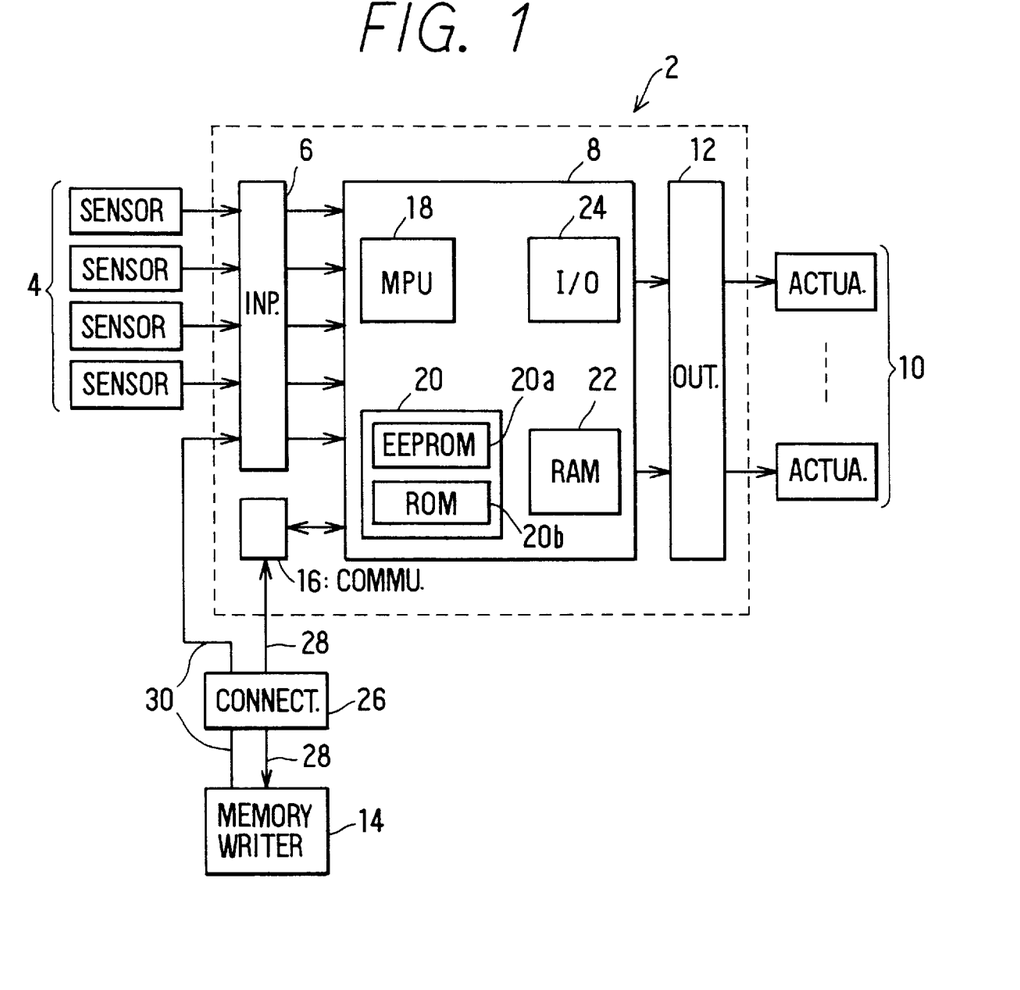
FIG. 1 is a block diagram of an entire construction of an engine controller according to a first embodiment of the present invention.

FIG. 1 is a block diagram illustrating an overall construction of an engine controller 2 according to a first embodiment of the present invention. FIG. 1 shows the engine controller 2 which is installed in a vehicle and which controls an internal combustion engine. The engine includes a variety of sensors 4 for indicating an operating condition with signals from these sensors 4 being provided to the engine controller 2. The engine controller 2 includes an input processor 6 for processing the signals from the sensors 4, a CPU 8 for calculating an optimal operating condition of the engine based on the processed sensor signals, an output circuit 12 for receiving calculation results of the CPU 8 as control signals for driving actuators 10 of a fuel injection unit, an ignition unit and the like which are installed on the engine, and a communication circuit 16 for performing data communication with a memory writer 14 which is outside of the engine controller 2. The memory writer 14 may be coupled to the engine controller 2 when tuning or testing engine characteristics.

The CPU 8 includes an MPU (microprocessor unit) 18 which operates by following a control program, a ROM 20 for storing a program and data needed for making the MPU 18 operate, a RAM 22 for storing calculation results of the MPU 18, and an I/O (input-output unit) 24 for receiving signals from the input processor 6 and the communication circuit 16, and generating control signals to the output circuit 12. It must be noted here that an erasable flash EEPROM (electrically erasable programmable read-only memory which is commonly known as flash ROM or flash memory) 20a which allows deletion of all data stored therein is used in one part of the ROM 20. A nonerasable ROM 20b is provided at another portion of the ROM 20. The flash EEPROM and the EEPROM may be used for the nonerasable ROM 20b as long as deletion and overwriting operations thereon are prohibited.

The memory writer 14 and the engine controller 2 are connected with each other such that signals can be transmitted between them via a bus connection connector 26 when tuning or testing the engine. A communication bus line 28 connected to the bus connection connector 26 enables transmission of data between the CPU 8 and the memory writer 14 based on a serial transmission function. Moreover, as will be described later, a mode determination control signal line 30 connected to the memory writer 14 via the bus connection connector 26 enables the memory writer 14 to set the operating mode of the CPU 8 after the CPU 8 is reset.

Under a predetermined condition, a part of the program and data received by the CPU 8 via the communication bus line 28 are stored in the RAM 22 as program and data for execution. Other portions of the received program and data are stored in the programmable EEPROM 20a in replacement of other program and data already stored therein.

Figure 2:
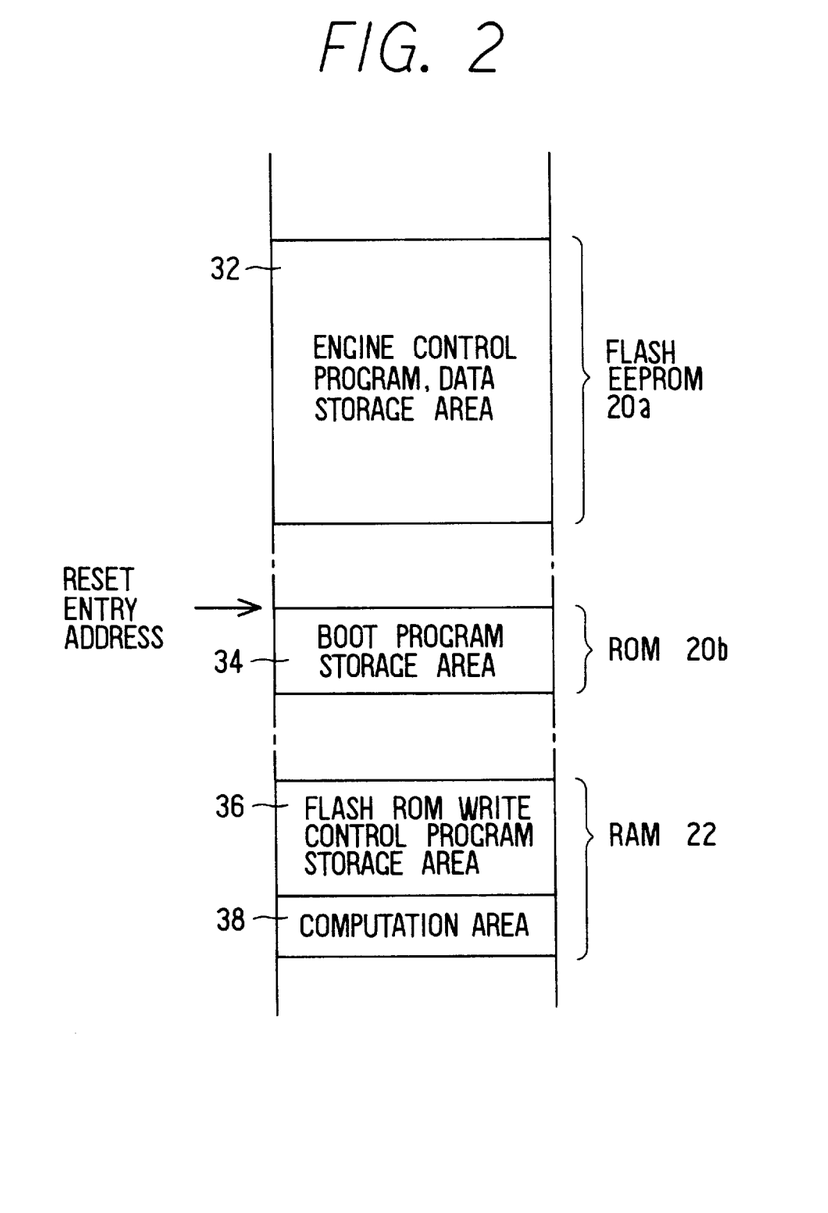
FIG. 2 is an explanatory view of a memory region of a CPU of the engine controller.

FIG. 2 illustrates memory regions of the ROM 20 and the RAM 22. The flash EEPROM 20a is provided with an engine control program and data storage area 32 in which the appropriate control program and control data are already stored. That is, control program and control data stored in the engine control program and data storage area 32 are stored as the built-in program and the built-in data.

A boot program storage area 34 which stores the appropriate boot program is provided in the nonerasable ROM 20b. A flash ROM write control program storage area 36 and a computation area 38 are provided in the RAM 22. The flash ROM write control program received from the memory writer 14 is stored in the flash ROM write control program storage area 36 under a predetermined condition and the computation area 38 is used for calculation operations during the execution of the flash ROM write control program.

Normally, the engine control program and data storage area 32 contains engine control program and engine control data while the boot program storage area 34 contains a boot program. Immediately after resetting, the CPU 8 activates the boot program which has a reset entry address and executes engine control by calling the engine control program from the boot program.

Figure 3:
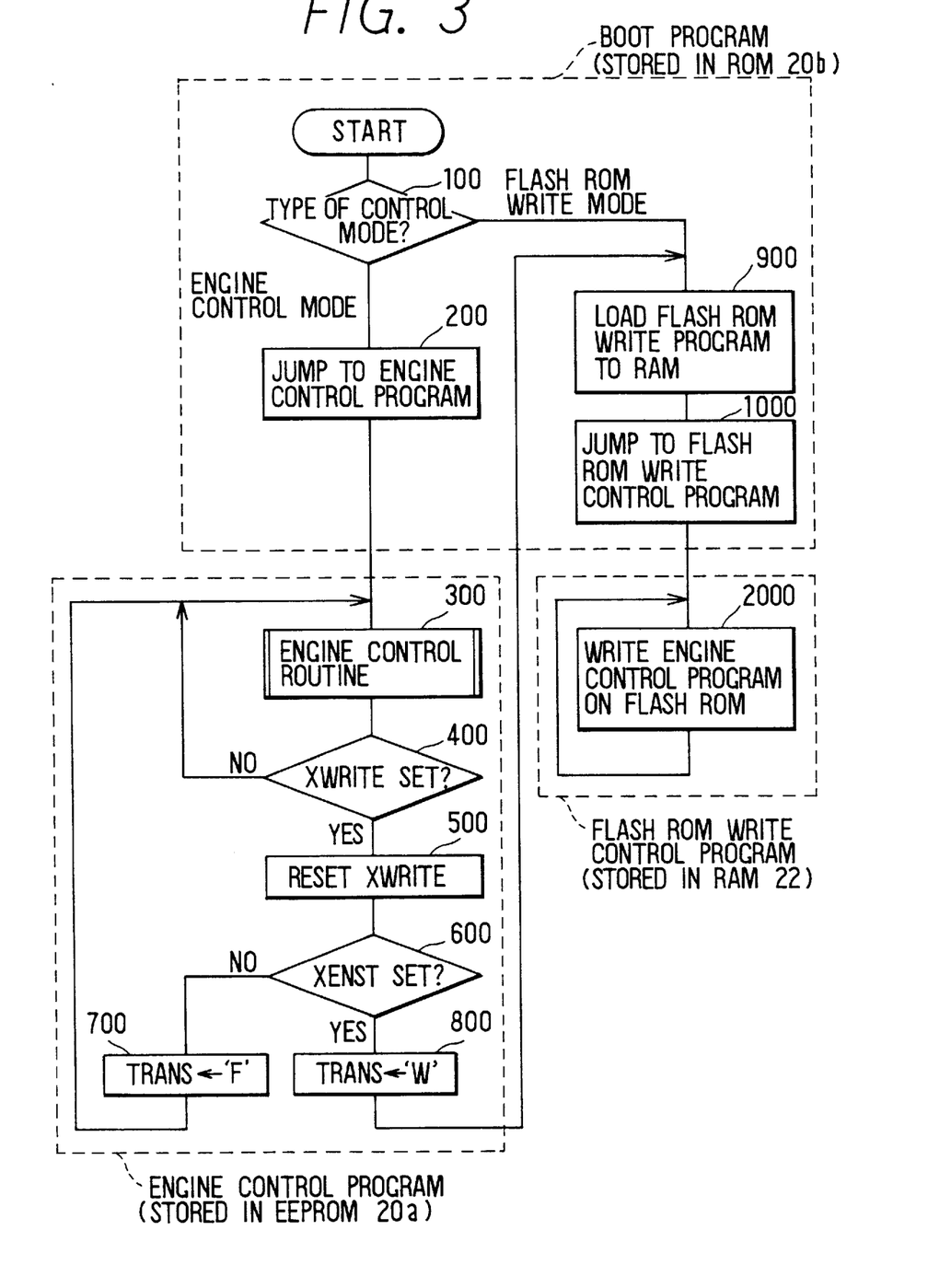
FIG. 3 is a flowchart of a boot program, an engine control program and a write control program according to the first embodiment.

FIG. 3 illustrates a flowchart of the boot program and the engine control program.

After resetting the CPU 8, execution of the boot program in the nonerasable ROM 20b is started and step 100 checks the mode determination control signal to determine the type of control mode based on the mode determination control signal of the mode determination control signal line 30. If step 100 determines that the mode determination control signal indicates an engine control mode, control goes to step 200 which enables jumping to the engine control program. As a result, control goes to the engine control program stored in the flash EEPROM 20a and step 300 executes an engine control routine based the engine control data.

Figure 4:
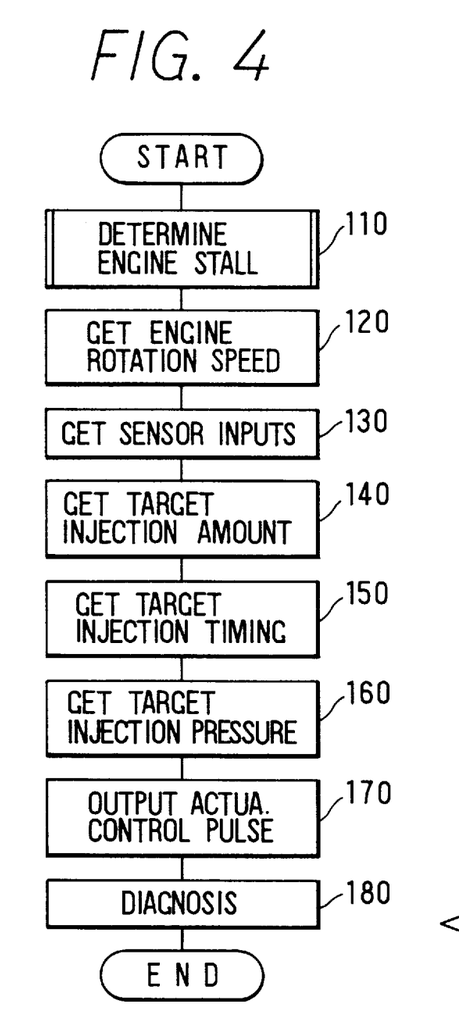
FIG. 4 is a flowchart of an engine control routine according to the first embodiment.

The engine control routine may be, for example, like the routine shown by the flowchart of FIG. 4. In this routine, step 110 executes an engine stall determination process, step 120 executes an engine rotation speed calculation process, step 130 involves sensor input processing, step 140 executes a target fuel injection amount calculation process, step 150 executes a target fuel injection time calculation process, step 160 executes a target fuel injection pressure calculation process, step 170 executes an actuator control pulse output process and step 180 executes various self-diagnostic processes.

The engine stall determination process of step 110 determines an engine stall when the pulse signal generated in correspondence with a rotational speed of the engine by a rotational speed sensor provided in the engine is not detected by the CPU 8 for more than a predetermined time period X. The engine stall determination process of step 110 is illustrated in a flowchart of FIG. 5.

Figure 5:
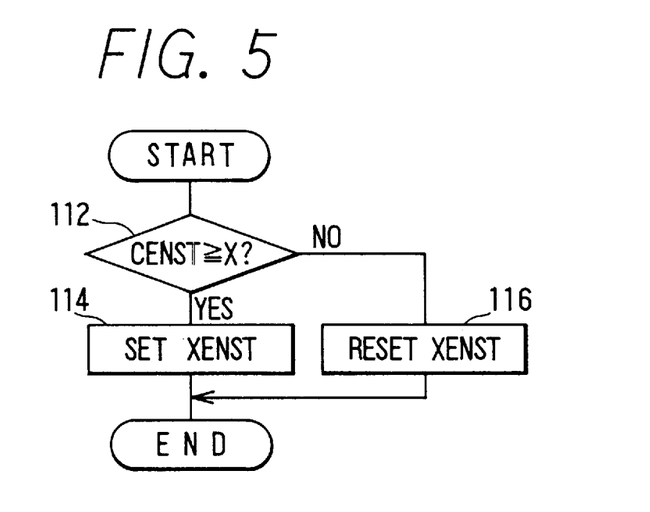
FIG. 5 is a flowchart of an engine stall determination process according to the first embodiment.

In this engine stall determination process, step 112 determines a value of a time counter CENST which indicates the elapsed time since the latest pulse signal. If the value of the time counter CENST is no less than the predetermined time period X, step 112 determines there is an engine stall and step 114 sets an engine stall flag XENST. If the value of the CENST is less than the predetermined time period X, step 116 resets the engine stall flag XENST.

Figure 6A:
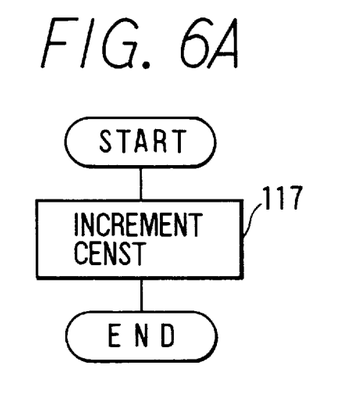
FIG. 6A is a flowchart of a process for incrementing a time counter CENST.
Figure 6B:
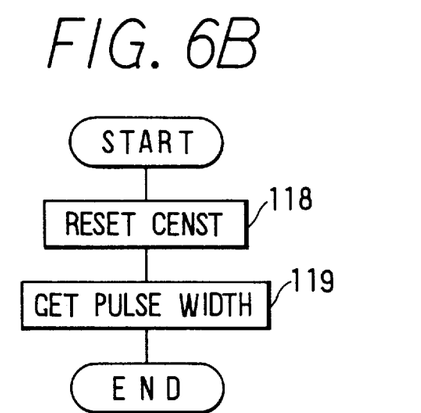
FIG. 6B is a flowchart of an engine rotational speed pulse input interruption process for resetting the time counter CENST.

The time counter CENST is shown in the flowcharts of FIGS. 6A and 6B. In the flowchart of FIG. 6A which is a periodic interruption process, step 117 increments the time counter CENST at a predetermined period. In an engine rotation speed pulse input interruption process of FIG. 6B, step 118 resets the time counter CENST every time the engine rotational speed pulse is received. Therefore, unless the engine rotational speed pulse is received by the CPU 8, the time counter CENST gradually increases and its value indicates the amount of time the engine rotational speed pulse has not been detected. In the engine rotation frequency pulse interruption process of FIG. 6B, at the same time, step 119 executes a pulse width measurement process for calculating the engine rotational speed based on the intervals between the engine rotational speed pulses.

Going back to the flowchart shown in FIG. 3, after the engine control routine of step 300 and before it is executed again, step 400 determines whether or not a flash ROM write request has been received based on a flash ROM write request flag XWRITE.

Figure 7:
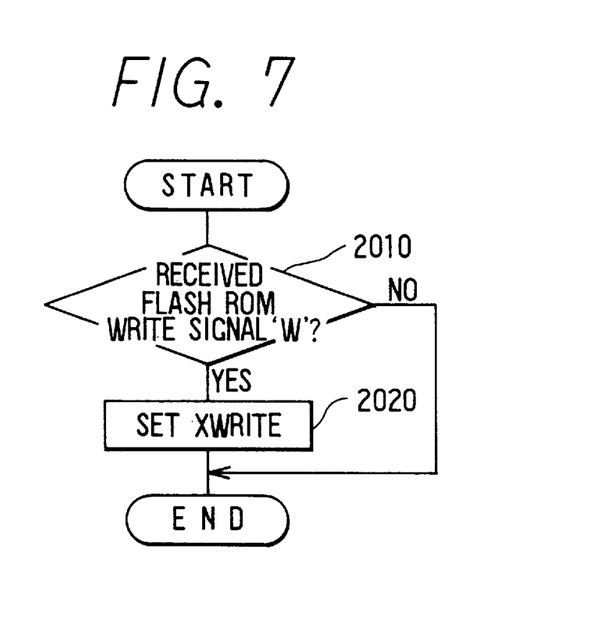
FIG. 7 is a flowchart of an interruption process for setting a flash ROM writing request flag XWRITE.

The flash ROM write request flag XWRITE is set in the SCI process which is carried out when serial signals are received from the memory writer 14 connected to the engine controller 2 via the communication bus line 28. That is, when the CPU 8 receives serial signals from the memory writer 14, the SCI process shown in FIG. 7 is carried out wherein step 2010 determines whether or not a flash ROM write request signal 'W' has been received from the memory writer 14. If step 2010 determines that the flash ROM write request signal 'W' has been received, step 2020 sets the flash ROM write request flag XWRITE. This process terminates if step 2010 gives a negative output.

Going back to the flowchart of FIG. 3, step 400 checks if the flash ROM write request flag XWRITE is set every time the engine control routine of step 300 is executed. If the flash write request flag XWRITE is not set, then step 300 again executes the engine control routine.

When the flash ROM write request flag XWRITE is set, step 500 resets the same. Step 600 determines whether or not the engine is at a stop by checking the engine stall flag XENST processed in the engine stall determination process shown in FIG. 5. If the engine stall flag XENST is reset, then the engine is determined to be in operation and step 700 sets a reply code TRANS, which is sent to the memory writer 14 via the communication bus line 28, to an engine stop request code 'F' and step 300 repeats the execution of the engine control routine.

The engine stop request code 'F' set in the reply code TRANS is transmitted to the memory writer 14 via the communication bus line 28 by a transmission interruption process (not shown in the figure) of the CPU 8. Upon receipt of the engine stop request code 'F', the memory writer 14 displays on its monitor the engine stop request code 'F' or comments indicating the contents thereof.

Therefore, the engine controller 2 makes a request to an operator of the vehicle to stop the engine. Thus, even though the memory writer 14 generates the flash ROM write request 'W', the CPU 8 does not go to the flash ROM write process (step 900 and subsequent steps) unless the engine is stopped. Thus, the engine continues to be controlled by the present control program and control data.

Next, when the operator stops the engine and the memory writer 14 again generates the flash ROM write request signal 'W', because the engine stall flag XENST is set following the termination of the engine, step 800 sets the flash ROM write mode allowance code 'W' as the reply code TRANS. Next, step 900 downloads the flash ROM write control program from the memory writer 14 to the RAM 22 of the CPU 8.

That is, upon receipt of the flash ROM write mode allowance code 'W', the memory writer 14 generates the flash ROM write control program stored in a memory medium coupled to it such as ROM, RAM, a magnetic disk or the like to the engine controller 2 via the communication bus line 28 based on a predetermined handshaking procedure. In step 900, the CPU 8 receives the flash ROM write control program and stores it in the flash ROM write control program storage area 36 of the RAM 22.

After receiving the flash ROM write control program, step 1000 jumps to the start address of the flash ROM write control program storage area 36 and starts the flash ROM write control program.

The flash ROM write control program of step 2000 overwrites a part or the entire portion of the program and data of the engine control program and data storage area 32 of the flash EEPROM 20a following the steps enumerated below.

First, the start address of the target memory area to be overwritten (or deleted) is read from the memory writer 14 via the communication bus line 28 and the target memory area to be overwritten (or deleted) is cleared.

Then, new program and data are read from the memory writer 14 via the communication bus line 28 and are written in the memory region in the flash EEPROM 20a which was cleared off the previous program and data.

The CPU 8 receives all programs and data needed for overwriting from the memory writer 14 and generates write completion signals to the memory writer 14 via the communication bus line 28 upon completion of overwriting the flash EEPROM 20*a*. Then, control goes to an infinite loop which repeatedly generates the write completion signals.

After receiving the write completion signals, the memory writer 14 displays a write completion message on its monitor. Accordingly, when the operator sets the mode determination control signal line 30 to the engine control mode and resets the CPU 8, because writing on the boot program storage area 34 is prohibited, the same boot program is again started and thus, first of all, step 100 checks the mode determination control signal. Since the mode determination control signal from the memory writer 14 indicates the engine control mode, step 200 starts the engine control program stored in the engine control program and data storage area 32 of the flash EEPROM 20*a*.

As described above, a part or the whole portion of the engine control program and the control data used in the engine control program are overwritten. Therefore, the engine control routine of step 300 executes a type of engine control different from the control program before overwriting. At this point, since the engine is at a stop, there will be no unusual operations in the mechanism of the vehicle as in conventional devices.

Since steps 400 to 800 are not overwritten in the present embodiment, the function of jumping from the engine control to overwriting the engine control program and data storage area remains intact. Of course, such a function remains intact if the same contents are written for steps 400 to 800. Moreover, steps 400 to 800 can be overwritten to implement better routines.

Furthermore, steps 400 through 800 may be placed in the nonerasable ROM 20*b* in the same way as the boot program instead of being placed in the engine control program and storage area 32. In this case, the new control program may be set to call steps 400 to 800 every time it is executed. In addition, steps 400 to 800 may also be in a region of the same engine control program and storage area 32 provided that overwriting in such a region which is done in step 2000 is prohibited. In both of the above-described cases, the functions of steps 400–800 remain intact.

In the present embodiment, since the writing of the engine control program and control data are not executed unless the engine is at a stop, abnormalities in the operating conditions of the vehicle due to the switching of the control program and the control data while the engine is in operation will not occur. Thus, the operator will not feel uneasy.

Moreover, after overwriting the control program and data and resetting the CPU 8, since the CPU 8 starts operations from the boot program in the boot program storage area 34 and not from step 300, there will be no program abnormalities such as those that occur when control goes to an empty engine control program and data storage area 32 after the overwriting procedure of step 2000 fails with the previous control program and control data already erased from the same storage area 32.

A second embodiment of the present invention is described hereinafter.

Figure 8:
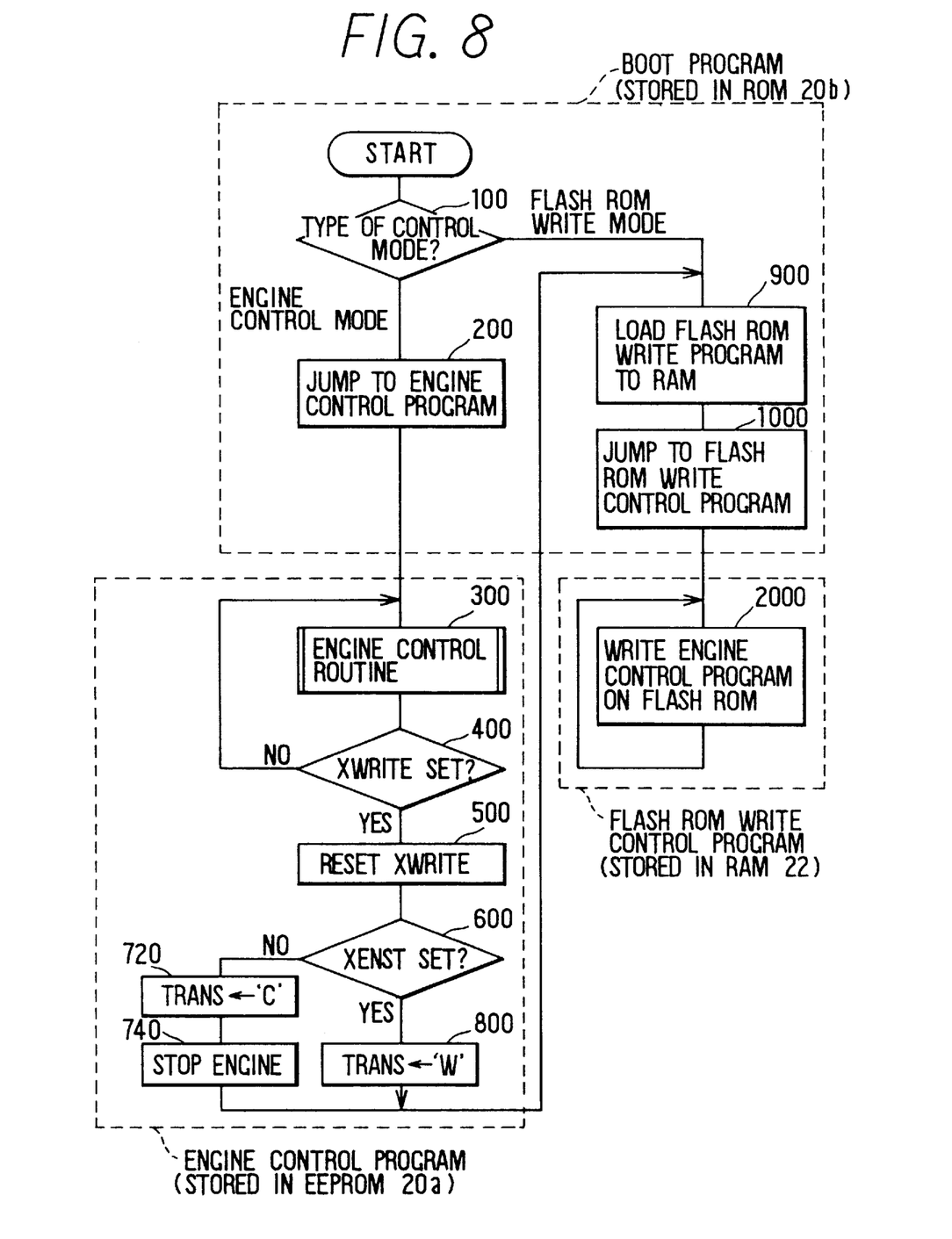
FIG. 8 is a flowchart illustrating the boot program, the engine control program and the write control program according to a second embodiment of the present invention.

The process of the second embodiment is shown by the flowchart of FIG. 8. Explanation of constructions and processes similar to those of the first embodiment are omitted here. The process of FIG. 8 differs from the process of FIG. 3 in that steps 720 and 740 are executed here instead of step 700 after step 600 determines that the engine is in operation when the engine stall flag XENST is not set.

In order to notify the memory writer 14 of the compulsory stoppage of the engine, step 720 sets the reply code TRANS to the engine compulsory stop code 'C'. As a result, the engine compulsory stoppage command is transmitted to the memory writer 14 via the communication bus line 28. Therefore, after receiving the engine compulsory stop code 'C', the memory writer 14 displays on its monitor the automatic stoppage of the engine to inform the operator.

Step 740 stops the engine by setting the target fuel injection amount to zero, stopping the electric power supply to an ignition unit or the like.

With the operation of the engine stopped in this way, there will be no need to return to step 300 and thus, control goes to the process of step 900 after step 740. In the same way as the first embodiment, control goes to the overwriting process of the program and data inside the engine control program and data storage area 32.

Since the engine is automatically stopped when the engine control program and control data are to be overwritten, the engine control program and control data are not overwritten while the engine is in operation. Therefore, since there is no switching to a different control program while the engine is in operation, there will be no abnormalities in the operating condition of the vehicle which may make the operator feel uneasy. The present embodiment gives the same effects as that of the first embodiment.

Although the present invention has been fully described in connection with preferred embodiments thereof with reference to the accompanying drawings, it is to be noted that various changes and modifications will become apparent to those skilled in the art.

In each of the above-described embodiments, step 2000 enters an infinite loop for repeatedly generating the overwriting completion signals to the memory writer 14 after the completion of overwriting the engine control program and data. However, the CPU 8 may be reset after the completion of the overwriting. Furthermore, control may go to the process of step 300 after step 2000 without resetting the CPU 8 so that engine control based on the new program and data can be started. In this case, problems in the vehicle will not occur since the engine is not in operation.

Also, while the engine is stopped in step 740 of the second embodiment immediately after step 720 informs the memory writer 14 of the engine compulsory stoppage, the engine may also be stopped after making a lamp or the like of the engine controller 2 flash to give notice of the engine stoppage without informing the memory writer 14.

In the second embodiment, since a malfunction in the engine occurs and the operator feels uneasy when the engine stops suddenly, the engine rotational speed may be reduced first to an idling state and thereafter the engine can be stopped. Moreover, the engine may be stopped after maintaining the rotation of the engine for a time period it takes the operator to realize the compulsory stoppage of the engine after step 720 informs the memory writer 14 of the engine compulsory stoppage.

Also, when the engine is to be stopped automatically, step 720 may request the memory writer 14 for permission to execute the compulsory stoppage of the engine and execute step 740 when the memory writer 14 sends a code from the operator for permitting the engine stoppage. When the operator sends the code for not allowing the engine stoppage, the engine is not stopped, control returns to step 300 and the overwriting process of the program and data is disabled.

In each of the above-described embodiments, step 100 checks the mode determination control signal from the mode determination control signal line 30 after resetting the CPU 8 and control goes to the write process after step 100 determines that the CPU 8 is in the flash ROM write mode. However, the fact that control can go to the same write process with a write command from the memory writer 14 in the engine control mode renders step 100 unnecessary. Therefore, the engine control program control data can be overwritten with no need for providing the mode determination control signal line 30.

Therefore, conventional tools such as a diagnostic reader, which reads diagnostic data from the engine controller 2 and the like via a normal communication bus connector that has no mode determination control signal line 30, can be used by incorporating the functions of the memory writer 14 into such tools and so, conventional tools can be used without any need for special equipment.

While each of the embodiment deals with overwriting the engine control program and data, the present invention need not be limited to such and may be used in other various applications. For example, the present invention can be used for brake control, transmission control, suspension control and the like wherein a whole portion or a part of a brake mechanism, transmission mechanism, suspension mechanism is driven by the operation of the engine. In other words, when overwriting the control program and data for executing brake control, transmission control or the like under such a circumstance, unexpected changes in the operating condition which makes the operator feel uneasy and control problems due to failure to write the control program might occur.

Therefore, in the same way as the first and second embodiments described above, while the engine is in operation and there is a command to overwrite the brake control program, transmission control program, suspension control program or the like, there will be no unexpected operations in the mechanisms driven by the engine since the engine is stopped manually or automatically after notifying the operator.

Further, when overwriting the brake control program, transmission control program, suspension control program or the engine control program as in the case of the above-described embodiments, the overwriting of the control program and data may be allowed not only after determining whether the engine is rotating or not but also after determining whether the vehicle is in operation or not. That is, overwriting of the control program is allowed when it is determined that the vehicle is not in operation. Also, it may also be that overwriting of the control program and data is allowed when the gear of the vehicle is a neutral position.

In each of the above-described embodiments, although the flash ROM write control program is executed after the same is received from the memory writer 14 and stored in the flash ROM writing control program storage area 36 of the RAM 22, the same program may also be provided in the nonerasable ROM 20*b*, so that there is no need to download the same from the memory writer 14.

The boot program provided in the nonerasable ROM 20*b* is executed at the start of the resetting of the CPU 8. This prevents malfunctions in the CPU 8 by assuring that there will be no jumps to a region in which nothing is written after overwriting of the engine control program fails. Further, in the jumping process of step 200 to the engine control program, when the same step 200 determines that nothing is written in a jump destination, such jump is stopped and an error code is generated to the memory writer 14 to notify the operator of the error.

By the way, it should be noted here that the controller 2 may be provided with a monitor which displays the operating condition of the machine being controlled.

Meanwhile, while overwriting an existing control program has been discussed here, it must also be noted that the present invention can also be used for writing an initial control program.

Such changes and modifications are to be understood as being within the scope of the present invention as defined by the appended claims.

What is claimed is:

1. A machine controller for controlling operation of a machine, said controller including a built-in computer program and control data stored in at least one memory device to control the operation of a computer, said machine controller comprising:

write command detecting means for detecting an external write command;

operating condition detecting means for detecting an operating condition of said machine predetermined to correspond to substantial inoperativeness of said machine; and writing means for overwriting an externally supplied control program on said built-in program based on said external write command detected by said write command detecting means and said operating condition detected by said operating condition detecting means.

2. A machine controller according to claim 1, wherein:

said writing means overwrites said control program on said built-in program only when said write command detecting means detects input of said external write command and said operating condition detecting means detects said operating condition which indicates that said machine is at a stop.

3. A machine controller according to claim 1 further comprising reporting means for indicating said operating condition of said machine in a humanly recognizable manner, wherein:

said reporting means indicates that said machine is at a stop and said writing means overwrites said control program on said built-in program only when said write command detecting means detects input of said external write command and said operating condition detecting means detects said operating condition which indicates that said machine is at a stop.

4. A machine controller according to claim 1 further comprising terminating means for terminating operation of said machine, wherein:

said writing means overwrites said control program on said built-in program only when said write command detecting means detects input of said external write command and said operating condition detecting means detects said operating condition which indicates that said machine is at a stop after said terminating means terminates said operation of said machine.

5. A machine controller according to claim 4, wherein:

said terminating means gradually terminates operation of said machine.

6. A machine controller according to claim 4, wherein:

said writing means overwrites said control program on said built-in program when a predetermined time elapses after said operating condition detecting means detects said operating condition which indicates that said machine is at a stop.

7. A machine controller according to claim 1 further comprising:

a memory unit for storing an overwriting routine which remains intact when said writing means overwrites on said built-in program, wherein said writing means overwrites said control program on said built-in program following said overwriting routine.

8. A machine controller according to claim 1 further comprising:
a booting means for activating said built-in program.

9. A machine controller according to claim 1, wherein:
said machine is a vehicle and said built-in program controls said vehicle.

10. A machine controller according to claim 9, wherein:
said built-in program controls an engine of said vehicle.

11. A machine controller according to claim 10, wherein:
said operating condition detecting means detects rotation of said engine of said vehicle.

12. A machine controller according to claim 1 wherein said built-in computer program comprises:
a programmable ROM unit for storing said built-in program.

13. A machine controller according to claim 1, wherein said writing means also overwrites said control data.

14. A program writing method of a machine controller for controlling a machine said controller including a built-in computer program stored in at least one memory device to control the operation of a computer, said method comprising the steps of:
detecting an external write command;
detecting a stop of said machine; and
overwriting an externally supplied control program on said built-in program only when said external write command is detected and said stop is detected.

15. A program writing method according to claim 14 additionally comprising the step of:
indicating said stop of said machine in a humanly recognizable manner after detecting said stop of said machine.

16. A program writing method according to claim 15 additionally comprising the step of:
stopping operation of said machine after detecting said external write command and before indicating said stop.

17. A program writing method according to claim 14 additionally comprising the step of:
automatically stopping operation of said machine after detecting said external write command.

18. A program writing method according to claim 17, wherein:
said stopping step gradually stops said operation of said machine.

19. An engine controller for controlling operation of a vehicle engine following a built-in program and control data, said controller comprising:
write command detecting means for detecting an external write command when said built-in program is being executed to control said engine;
operating condition detecting means for detecting an engine operating condition corresponding to engine stoppage; and
writing means for overwriting an externally supplied control program on said built-in program based on said external write command only when said operating condition is detected.

20. An engine controller as in claim 19 wherein:
said writing means overwrites said control program on said built-in program only when said external write command is detected and said operating condition is detected.

21. An engine controller as in claim 19 further comprising:
reporting means for reporting, in a humanly recognizable manner, said engine operating condition;
wherein said reporting means indicates engine stoppage and said writing means overwrites said control program on said built-in program only when said external write command is detected and said operating condition is detected.

22. An engine controller as in claim 19 further comprising:
terminating means for terminating operation of said engine;
wherein said writing means overwrites said control program on said built-in program only when said external write command and said operating condition are detected after said terminating means terminates engine operation.

23. An engine controller as in claim 22 wherein:
said terminating means gradually terminates operation of said engine.

24. An engine controller as in claim 22, wherein:
said writing means overwrites said control program said built-in program when a predetermined time elapses after said operating condition is detected.

25. An engine controller as in claim 19 further comprising:
a memory unit for storing an overwriting routine which remains intact when said writing means overwrites on said built-in program;
wherein said writing means overwrites said control program on said built-in program following said overwriting routine.

26. An engine controller as in claim 19 further comprising:
a booting means for activating said built-in program.

27. A method of writing computer program into the memory of an engine controller, said method comprising the steps of:
detecting an external write command;
detecting engine stoppage; and
overwriting an externally supplied control program on another program already residing in the controller memory only when said external write command is detected and said engine stoppage is detected.

28. A method as in claim 27 additionally comprising the step of:
reporting on said detected engine stoppage in a humanly recognizable manner.

29. A method as in claim 28 additionally comprising the step of:
stopping engine operation after detecting said external write command and before reporting on engine stoppage.

30. A method as in claim 27 additionally comprising the step of:
stopping engine operation after detecting said external write command.

31. A method as in claim 30 wherein:
said stopping step gradually stops said engine operation.

32. A motor vehicle engine controller comprising:
a programmed computer including an associated memory storing first computer program instructions for effecting control of predetermined engine operating parameters;

said programmed computer including second stored computer program instructions which detects substantial engine stoppage;

an input port connected to said programmed computer for transferring thereinto third computer program instructions to overwrite said first computer program instructions and thereafter effect modified control of predetermined engine operating parameters; and said programmed computer including fourth stored program instructions which permit overwriting of said first computer program instructions only if substantial engine stoppage has been detected.

33. A method for overwriting a first stored computer program in a computer memory used by a motor vehicle engine controller for effecting control of predetermined engine operating parameters, said method comprising using stored computer programs executed within said engine controller to effect the following steps:

controlling said predetermined engine operating conditions using said first stored computer program; and preventing the overwriting of said first stored computer program unless said engine is substantially stopped.

34. A method as in claim 33 further comprising:

automatically stopping said engine in response to an input request for overwriting of said first stored computer program with an externally supplied second computer program.

* * * * *